(12) United States Patent
Richardson (10) Patent No.: US 7,146,568 B2
(45) Date of Patent: Dec. 5, 2006

(54) DYNAMICALLY DRILLING-DOWN THROUGH A HEALTH MONITORING MAP TO DETERMINE THE HEALTH STATUS AND CAUSE OF HEALTH PROBLEMS ASSOCIATED WITH NETWORK OBJECTS OF A MANAGED NETWORK ENVIRONMENT

(75) Inventor: David E. Richardson, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 631 days.

(21) Appl. No.: 09/923,045

(22) Filed: Aug. 6, 2001

(65) Prior Publication Data

US 2002/0054169 A1 May 9, 2002

Related U.S. Application Data

(63) Continuation of application No. 09/523,387, filed on Mar. 10, 2000, now Pat. No. 6,271,845, which is a continuation-in-part of application No. 09/087,338, filed on May 29, 1998, now Pat. No. 6,054,987.

(51) Int. Cl.
  *G06F 17/00* (2006.01)
(52) U.S. Cl. ............... 715/736; 715/734; 715/735; 709/220; 709/223

(58) Field of Classification Search ............ 345/810, 345/825, 853–855, 866, 734–738, 747; 709/202–204, 709/223, 220, 224, 226; 715/810, 825, 734–738, 715/747
See application file for complete search history.

(56) References Cited

U.S. PATENT DOCUMENTS

| | | | | |
|---|---|---|---|---|
| 5,471,399 | A * | 11/1995 | Tanaka et al. ............... 716/11 |
| 5,848,243 | A * | 12/1998 | Kulkarni et al. ............ 709/224 |
| 5,990,892 | A * | 11/1999 | Urbain ........................ 345/853 |
| 5,995,916 | A * | 11/1999 | Nixon et al. ................. 702/182 |
| 6,040,834 | A * | 3/2000 | Jain et al. .................... 345/853 |
| 6,061,723 | A * | 5/2000 | Walker et al. ............... 709/224 |
| 6,272,150 | B1 * | 8/2001 | Hrastar et al. .............. 370/486 |
| 6,374,293 | B1 * | 4/2002 | Dev et al. .................... 709/220 |
| 6,456,306 | B1 * | 9/2002 | Chin et al. ................... 345/810 |
| 6,466,973 | B1 * | 10/2002 | Jaffe ........................... 709/223 |

FOREIGN PATENT DOCUMENTS

WO    WO99/30423    12/1997

* cited by examiner

*Primary Examiner*—Tadesse Hailu (57) ABSTRACT

User-configurable group views allow an administrator of a managed network, upon noticing that an icon is indicative of a critical event having occurred, as reflected in the color, shape, or other such indicator of the icon, to "drill down" to the network device or service that is the subject of the critical event and to then view an event or trap message associated with the critical event that is stored as a field of the network device or service effected by the critical event.

24 Claims, 10 Drawing Sheets

DYNAMICALLY DRILLING-DOWN THROUGH A HEALTH MONITORING MAP TO DETERMINE THE HEALTH STATUS AND CAUSE OF HEALTH PROBLEMS ASSOCIATED WITH NETWORK OBJECTS OF A MANAGED NETWORK ENVIRONMENT

RELATED APPLICATIONS

The present invention is a continuation of U.S. patent application Ser. No. 09/523,387 filed on Mar. 10, 2000 now U.S. Pat. No. 6,271,845, which is a continuation-in-part of U.S. patent application Ser. No. 09/087,338 filed on May 29, 1998 now U.S. Pat. No. 6,054,987.

BACKGROUND OF THE INVENTION

1. Field of the Invention

The present invention relates generally to network management, and more particularly, to monitoring health problems of network devices and services of a managed network environment.

2. Related Art

As computer networks have become more prevalent in corporate and other operating environments, network management software that is capable of solving network problems automatically and remotely has become more crucial. One of the major goals of any efficient network administration setup is the specification and measurement of acceptable performance thresholds for each machine in the network without creating additional network traffic. Network management software typically manages and automates administrative tasks across multiple machines in a network. Typical network management software allows administrators to measure log events and view status when performance criteria is not acceptable. Unfortunately, however, the administrator is often not informed of problems on the network by network management software until after one or more end users of the network has been affected Accordingly, there exists a need in the art for a proactive diagnosis of network management problems in a timely manner. There is further a need for a complete, global view of the network environment, including a view of all critical components. There exists a need to quickly display to the administrator of a network health problems associated with devices and services on the network and provide the administrator with the capability to quickly respond to and correct pending network problems before end users of the network are impacted.

The Simple Network Management Protocol (SNMP) and Common Management Information Protocol (CMIP) are network management protocols that provide a generic mechanism by which different manufacturers' equipment and/or services can be monitored and controlled from a management system, such as a UNIX server. A network component or service provided on a managed network can be monitored and controlled using a management protocol to communicate management information between network components and services on the network. A network component can include networked personal computers, workstations, servers, routers, bridges, print servers, print queues, and printers. Network services, particularly in an Internet environment, can include electronic mail (e-mail), browsers, and service level agreements. There exist several key areas of network management including fault management, configuration management, security management, performance management, and accounting management. With the ability to instruct a network component to report events and the ability to start processes on a network component, the network can be manipulated to suit changing conditions within a network system.

A key mechanism by which various network devices communicate with a management system is via SNMP traps or CMIP events. Hereafter, "events" will be used to refer to either SNMP traps or CMIP events. Events allow for unsolicited notifications to be sent from one network device or service to another. This same mechanism can be used for communication between various cooperating software components within the management system.

There are several software products that receive events and allow a user to manage network devices. One of these products, Network Node Manager (NNM) from Hewlett-Packard Company of Palo Alto, Calif., enables a user to manage network devices using a graphical user interface (GUI) along with graphically representing relationships between network devices. Hereafter "NNM" will be used to generically refer to a product that receives events and allows a user to manage network devices, such as HP's Network Node Manager. From the NNM console, a user is able to discover and display all of the network devices on the network and to proactively monitor and manage all servers on the network. This makes it easy to determine the network status or to follow the path of a failed print job, for instance, and determine the point at which it failed. Because it is easy for a user to see how a network is configured, it is easy to manage network devices and optimize the configuration. For instance, a configuration may be optimized by balancing the number of print queues per print server or the number of print servers per file server. Any network device may be managed by an NNM such as NetWare® file servers, print servers, print queues, and printers. (NetWare is a trademark of Novell, Inc.) During initialization of the NNM, network devices are automatically discovered and added to a topology database. Each network device is graphically represented by an icon on the NNM console. Using NNM, a user can proactively monitor and manage all network devices on a managed network. A user can monitor the state on a network device over various periods of time by keeping trend data. A user can use trend thresholds to troubleshoot problems on network devices or to plan future expansion of network devices, such as increasing volume and disk sizes, or increasing the number of users allowed access to a server at one time.

All events are assigned a default severity which can be overridden by the user. The NNM utilizes registration files for user configurable information. The severity level of each event that is received by the NNM that corresponds to a particular network device is represented by a unique color. The severity level of a network device is indicated on the NNM console by the color of the network device's icon. A critical event, for instance, is depicted with a red icon. For instance, by default, a critical event is indicated to the user when a network device icon on the NNM map changes color to red indicating a critical status related to that network device. Thus, the current status of the entire network can be easily inspected by a user using the color status indications of the network device icons.

While the occurrence of a critical event for a network device is depicted by a red icon or other indication for that device, the simple color indication of a red icon, for instance, does not, in and of itself, communicate to the user exactly the nature of the critical event that caused the icon to change to a red color. There is an unmet need in the art for a user, such as an administrator of the network environment, to be able to not only know that the icon for a particular device indicates the occurrence of a critical event, but to also be able to quickly and readily ascertain the exact nature of that critical event.

Network printers are graphically represented with a printer icon representing each of the network printers on the network. A user can remotely determine the "health" status of any of the network printers visually. The LED status on the network printer can then be browsed to determine if the printer needs to be serviced or if human intervention is required. For instance, it can determined if a printer has any of the following problems: Out of paper; Out of ink; Paper jam; Door open; Toner low; Printer problem; and Bin full. A drawback of this approach, however, is that the exact nature of is the critical event, e.g. door open, has to be determined by looking at the problem network printer device itself and cannot be determined remotely by looking at the red color icon of the problem network printer on the NNM network console.

Servers are graphically represented with a server icon representing each of the servers on the network. A server running the appropriate agent software may be managed by a user from the NNM console. A server running the appropriate agent software responds to management data requests from the NNM console and transmits alarms from the server to the NNM console. This makes it possible for the NNM to display real-time server performance and configuration data on those servers and to monitor key performance statistics including: CPU utilization; number of users; number of connections; memory usage and configuration; installed software; and disk and volume usage. Thresholds can be set on these parameters to cause an SNMP trap, or they can be graphed by the NNM to evaluate history or trends. Parts of a server may also be viewed when troubleshooting a problem. Viewing components of a server's configuration (the network interfaces, for example) might help solve a critical problem with the server.

Server faults may be managed by monitoring key parameters of the servers, such as CPU load and available disk space, as well as noting significant events, such as NetWare Loadable Modules (NLMs) being unloaded or trustee rights changing. These conditions may be monitored directly at the servers and passed to the NNM via SNMP traps. For file servers, a user can obtain current and historical trend data and set alarm thresholds for trend parameters so that the user is notified when a threshold is passed.

Novell's NetWare Management Agent (NMA) Management Information Base (MIBs) and trap definitions are integrated into NNM. NNM may be configured to integrate the NMA traps with associated Novel "NetExpert" help text. When an SNMP alarm is sent to an INNM console, the alarm can be reviewed for more detailed help text describing the problem. The alarm, however, is not directly correlated to the red icon indicating that a particular network device is having a problem. This means that the process of reviewing the alarm sent to the NNM console is separate from the process of viewing a red icon on the NNM console and that these processes are not correlated. The user can also follow detailed instructions that guide the user through a series of steps to resolve the problem discovered by the NMA agent.

Figure 3:
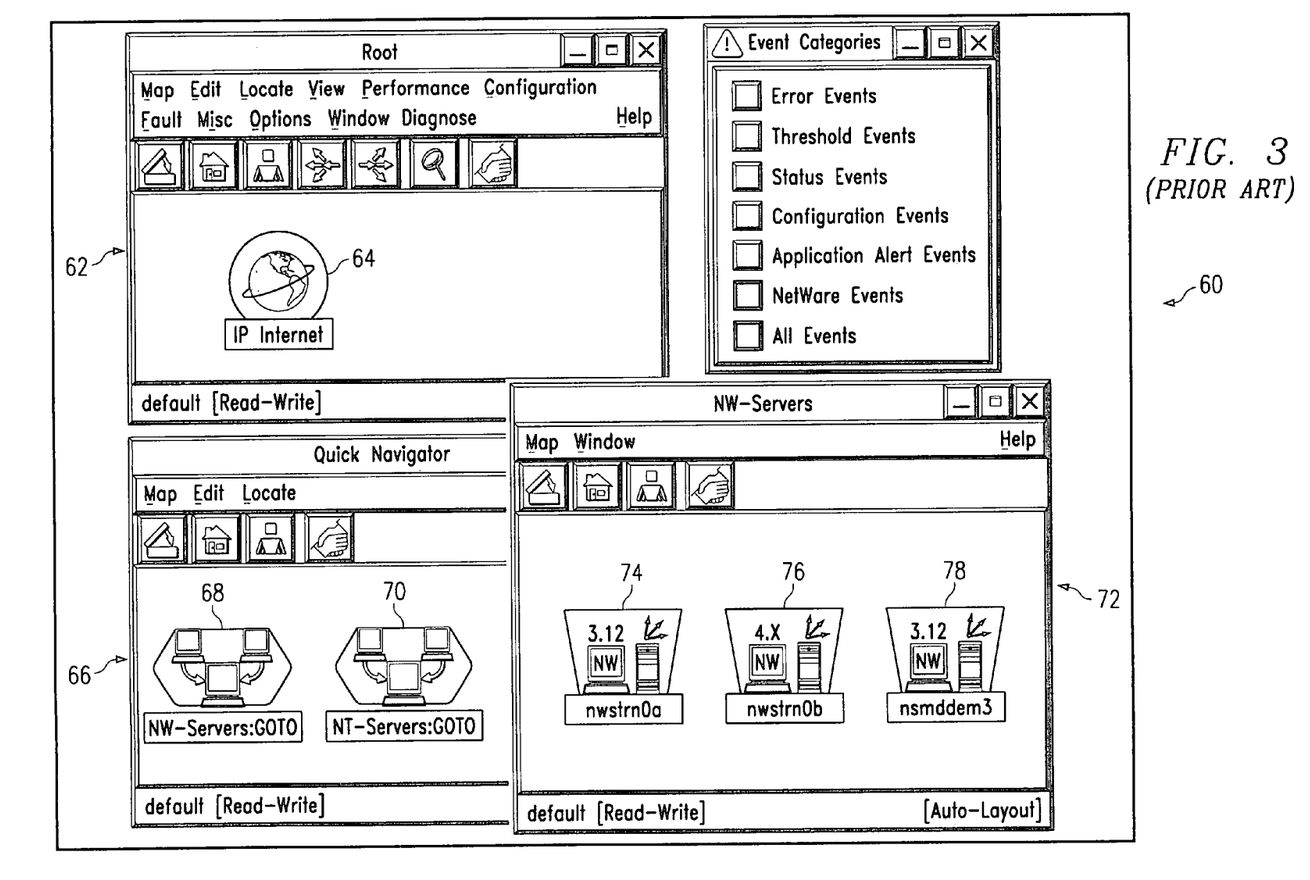
FIG. 3 illustrates IP-centric group views for graphically displaying network devices, according to the prior art.

Referring to FIG. 3, IP-centric group views 60 for graphically displaying network devices, according to the prior art, is shown. User interface 62 contains a representation of the network indicated by IP Internet icon 64. Double-clicking the IP Internet icon 64 will result in the presentation of user interface 66 having containers 68, 70 for the group views of the network indicated by NW-Servers:GOTO icon 68 and NT-Servers:GOTO icon 70. Double-clicking on NW-Servers:GOTO icon 68 will result in the presentation of user interface 72 containing the NW-Server-related network devices discovered by NNM during initialization. Three NW-Server-related network device icons are shown each representing individual network devices: nwstrn0a icon 74, nwstrn0b icon 76, and nsmdem3 icon 78. This group view configuration is considered IP-centric (Internet Protocol Centric) because during network device discovery all network devices are initially contained in a single group view that is presented by double-clicking on the IP Internet icon 64. A user may manually construct basic group views such as NW-Servers and NT-Servers as shown as NW-Servers:GOTO icon 68 and NT-Servers:GOTO icon 70, respectively.

Figure 4:
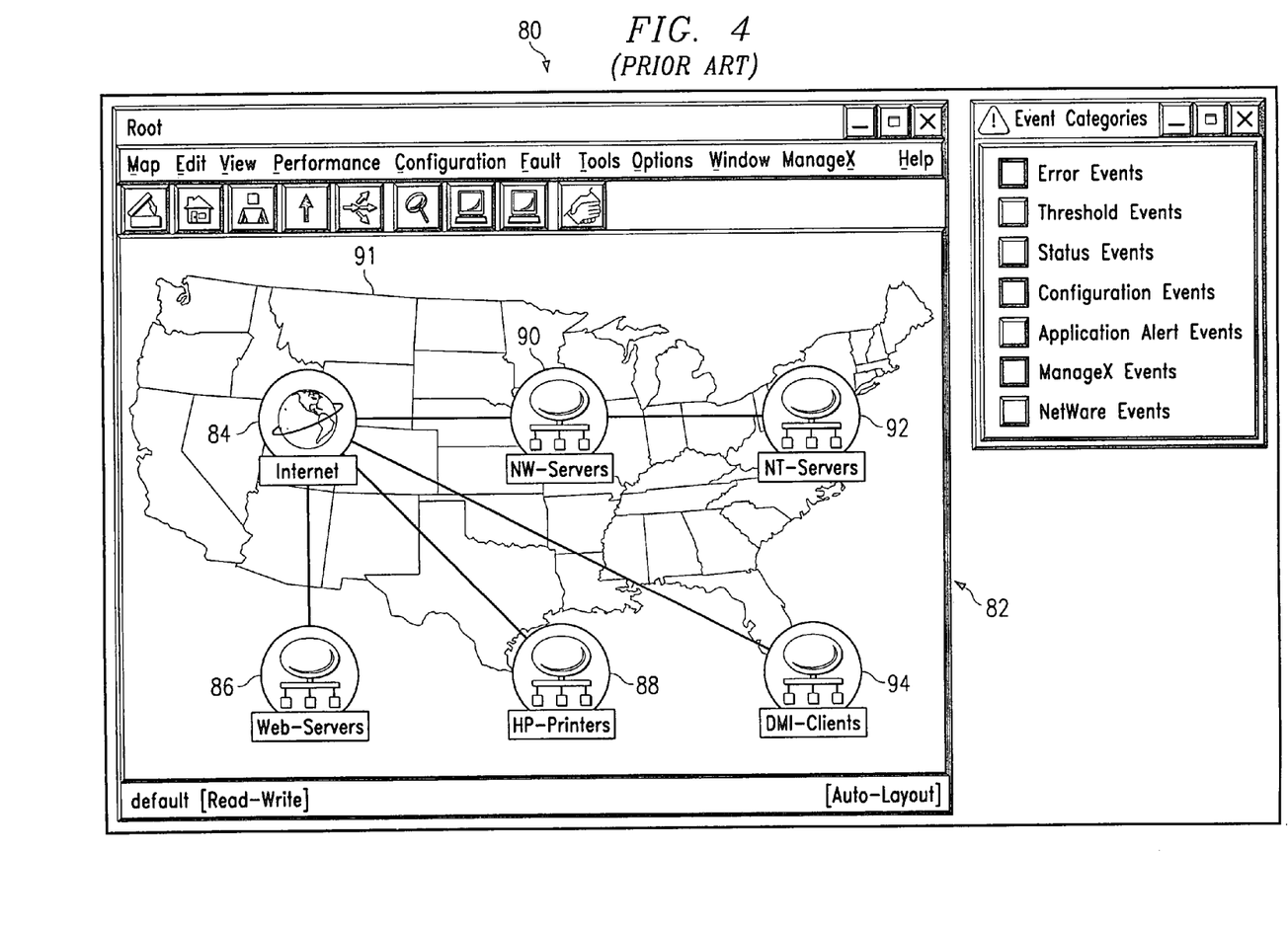
FIG. 4 illustrates device-centric group views for graphically displaying related network devices, according to the prior art.

NodeView is a product that enhances products that receive events and allow a user to manage network devices such as NNM. Using NodeView, related network devices are automatically grouped into maps represented by group icons. Group views are hardwired into the NodeView code itself. Referring to FIG. 4, device-centric group views 80 for graphically displaying network devices, according to the prior art, is shown. User interface 82 contains a representation of the network on top of background 91, a map of the United States. The top-level network is indicated by Internet icon 84. The group views of the network are represented by NW-Servers icon 90, NT-Servers icon 92, Web-Servers icon 86, HP-Printers icon 88, and DMI-Clients icon 94. This group view configuration is considered device-centric because during network device discovery related network devices are automatically grouped into group views represented by group view icons. Double clicking on a group icon will explode a map, hereafter referred to as a "group view", showing all the related devices that were previously discovered in the topology database. For instance, double-clicking on NW-Servers icon 90 will explode to a NetWare Servers group view showing all of the NetWare servers that were discovered in the topology database. A group view of related devices provides a user with a simple way to monitor and launch applications using the menubar and NetWare tool launcher from a single view of the managed environment. The menubars, popup menus, and toolbar remain consistent for each of the group views provided by NodeView.

In the prior art, the group views are hardwired into the NodeView code itself. This means that a NodeView user cannot select his/her own choices for group views nor dynamically update this selection. There is therefore an unmet need in the art to allow a user to be able to dynamically configure group view information. Additionally, the menubars, popup menus, and toolbar are not individually configured for a selected group view, but rather remain consistent regardless of whether an item is only applicable for certain group views and meaningless for others. There is therefore an unmet need in the art to allow the menubars, popup menus, and toolbar to be context sensitive to the group view.

SUMMARY OF THE INVENTION

It is therefore an object of the present invention to quickly display to the administrator of a managed network health problems associated with devices and services on the network and to provide the administrator with the capability to quickly respond to and correct pending network problems before end users of the network are impacted.

It is a further object of the present invention to allow for a proactive diagnosis of network management problems in a timely manner.

It is another object of the present to provide a complete, global view of the network environment, including the ability to provide a view of all critical components readily upon demand, to allow for this proactive diagnosis.

It is yet another object of the present invention to be able to readily and quickly ascertain the exact nature of a critical event that caused an icon representative of a network device or service to change to indicate the occurrence of the critical event.

Therefore, according to the present invention, user-configurable group views allow an administrator of the network, upon noticing that an icon is indicative of a critical event having occurred, as reflected in the color, shape, or other such indicator of the icon, to "drill down" via a user interface to the network device or service that is the is subject of the critical event and to then view an event or trap message associated with the critical event that is stored as a field of the network device or service effected by the critical event. According to the methodology of the present invention, health characteristics of each network object of interest in the network environment that determine the health status of each network object are defined. Each network object is grouped in a group view with other network objects that share attribute values that define the group view. The health characteristics of each network object are monitored in order to determine the health status of each health characteristic of each network object. Moreover, the health characteristics are stored in a health characteristic configuration file, such as a registration file, of a group view with which the network object it is associated with belongs. Group view containers of a map, each corresponding to a group view having a number of network objects within it all sharing common group attribute values, are displayed within the user interface. The health characteristics, the network objects, and the group view containers each have health status indicators that reflect health status. Health status indicators are intended to quickly convey to the user of the managed network, such as the administrator of the network, when a group view container, network object, or health characteristic is in poor health and may include the color or shape of an icon or an audible alarm. Determining the health status of each health characteristic includes comparing performance data of the health characteristic to a predetermined threshold of the health characteristic, and then, if the performance data of the health characteristic violates the predetermined threshold of the health characteristic, causing the health status indicator of the health characteristic to indicate a poor health condition of the health characteristic. Each group view displayed within the map that has a poor health status is identified by the health status indicator of its container. Selecting the container having a poor health indication, will cause the group view of that container to be displayed within the user interface. The user can quickly tell which of the network objects of the group view have poor health from the health status indicators of the network objects. Selecting the one or more objects having poor health will cause the health characteristics of the problem network objects to be displayed in the user interface. The one or more health characteristics having health problems, as indicated by the health status indicators of the health characteristics, can then be selected to cause a message to be displayed in the user interface that identified the event that caused the poor health status of each health characteristic of concern.

The drill-down of the present invention to determine the underlying, root cause of a poor health status need not start at the group view container level of the network hierarchy. If the user of the system is already viewing the network objects of a particular group view or the health characteristics of a particular network object, for instance, the drill-down would commence at that level.

BRIEF DESCRIPTION OF THE DRAWINGS

The novel features believed characteristic of the invention are set forth in the claims. The invention itself, however, as well as the preferred mode of use, and further objects and advantages thereof, will best be understood by reference to the following detailed description of an illustrative embodiment when read in conjunction with the accompanying drawing(s), wherein:

DESCRIPTION OF THE INVENTION

The present invention stores group view information, called group view attributes, in a file that may be edited by a NNM user so that a user can dynamically configure group view information. Group view attributes that may be edited include: the name of the group view, the background graphic image, the symbol type, and the context of the group view. NodeView utilizes registration files to create context sensitive group views such that only those items of a menubar, popup menu, or toolbar that are registered to a particular group view are shown when that group view is selected by the user. These user-configurable group views allow an administrator of the network, upon noticing that an icon is indicative of a critical event having occurred, as reflected in the color, shape, or other such indicator of the icon, to "drill down" to the network device or service that is the subject of the critical event and to then view an event or trap message associated with the critical event that is stored as a field of the network device or service effected by the critical event.

Figure 1A:
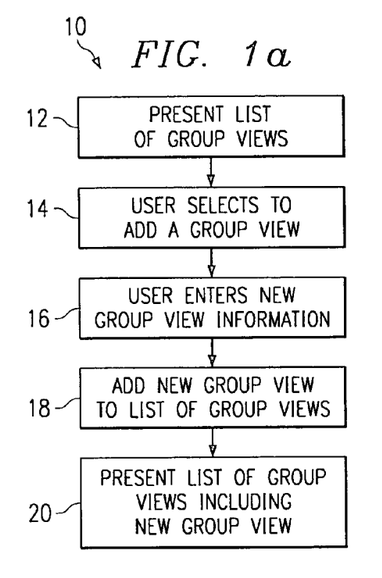
FIG. 1a illustrates a flow chart of dynamically adding group views, according to the present invention.

Referring to FIG. 1a, a flow chart of dynamically adding group views 10, according to one embodiment of the present invention, is shown. Initially, the user is presented with a list of group views at Block 12. The user selects to add a group view at Block 14. The user enters new group view information at Block 16. At Block 18 the new group view is added to the list of group views. Finally, at Block 20, the user is presented with a list of group views including the new group view.

Figure 1B:
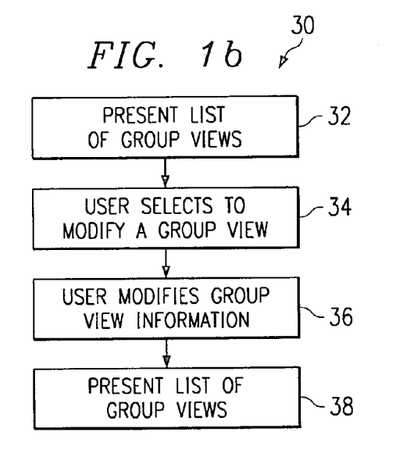
FIG. 1b illustrates a flow chart of dynamically modifying group views, according to the present invention.

Referring to FIG. 1b, a flow chart of dynamically modifying group views 30, according to the present invention, is shown. Initially, the user is presented with a list of group views at Block 32. The user selects to modify a group view at Block 34. The user modifies the group view information at Block 36. The user is again presented with a list of group views at Block 38.

Figure 1C:
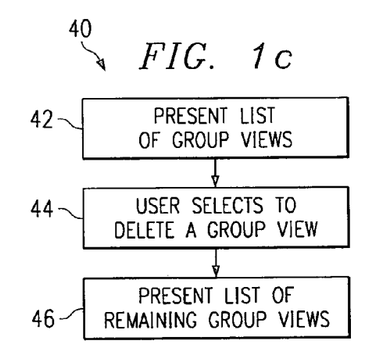
FIG. 1c illustrates a flow chart of dynamically deleting group views, according to the present invention.

Referring to FIG. 1c, a flow chart of dynamically deleting group views 40, according to the present invention, is shown. Initially, the user is presented with a list of group views at Block 42. The user selects to delete a group view at Block 44. The user is presented with a list of the remaining group views at Block 46.

Figure 2:
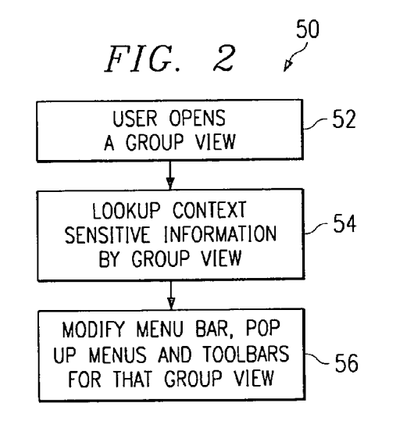
FIG. 2 illustrates a flow chart of the context sensitive menubars, popup menus, and toolbar, according to the present invention.

Referring to FIG. 2, a flow chart of the context sensitive menubars, popup menus, and toolbar 50, according to the present invention, is shown. The user opens a group view, at Block 52, by double-clicking on the group view icon. A lookup is performed on a NodeView registration file for the context sensitive information for that group view at Block 54. The menubars, popup menus, and toolbar for that group view are modified at Block 56.

Figure 5:
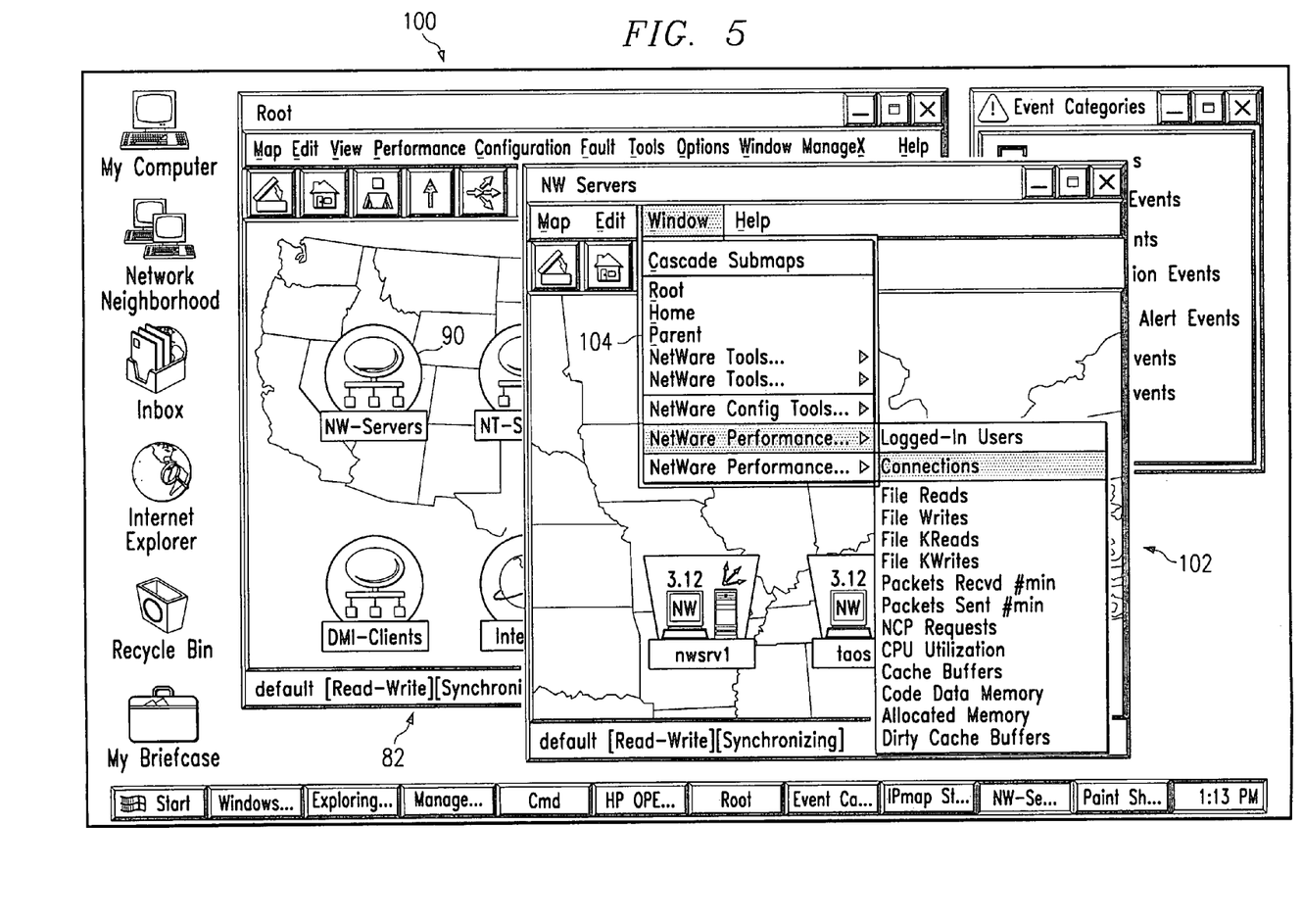
FIG. 5 illustrates a menubar that is context sensitive to the group view that is selected, according to the present invention.

Referring to FIG. 5, a menubar that is context sensitive to the group view that is selected according to the present invention, is shown. Double-clicking on NW-Servers icon 90 will result in the presentation of user interface 102 containing the NW-Servers-related network devices discovered by the NodeView-enhanced NNM during initialization. Selecting menubar 104 will result in the presentation of a menubar that is context sensitive to the group view selected, in this case NW-Servers.

Figure 6:
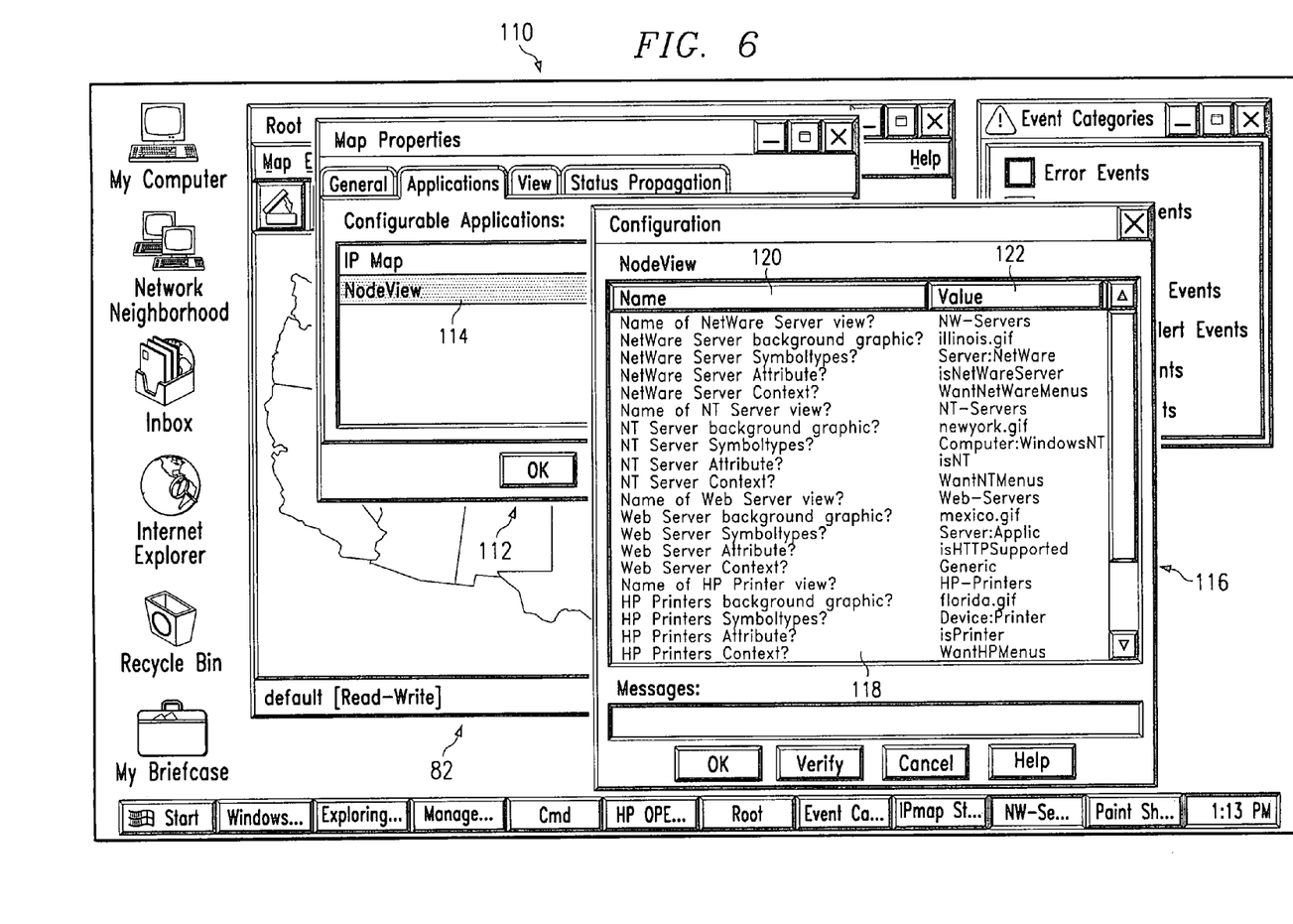
FIG. 6 illustrates editing group view information that is stored in a file using a graphically interface, according to the present invention

Referring to FIG. 6, an illustration of editing group view information, stored in a file, using a graphical user interface 110, according to the present invention, is shown. Selecting map properties from the menubar will result in the presentation of user interface 112 containing Configurable Applications selection list 114. Selecting NodeView from the Configurable Applications selection list 114 will result in the presentation of user interface 116 containing the group view attribute list 118. Group attributes are listed by name 120 and value 122. A group view attribute may be edited by selecting a group view attribute from the group view attribute list 118 and modifying that group view attribute's value.

The user-configurable group views described above allow an administrator of the network, upon noticing that an icon of a user interface of the NNM console is indicative of a critical event having occurred, as reflected in the color, shape, or other such indicator of the icon, to "drill down" to the network device or service (object) that is the subject of the critical event and to then view an event or trap message associated with the critical event that is stored as a field of the network device or service effected by the critical event.

Figure 7:
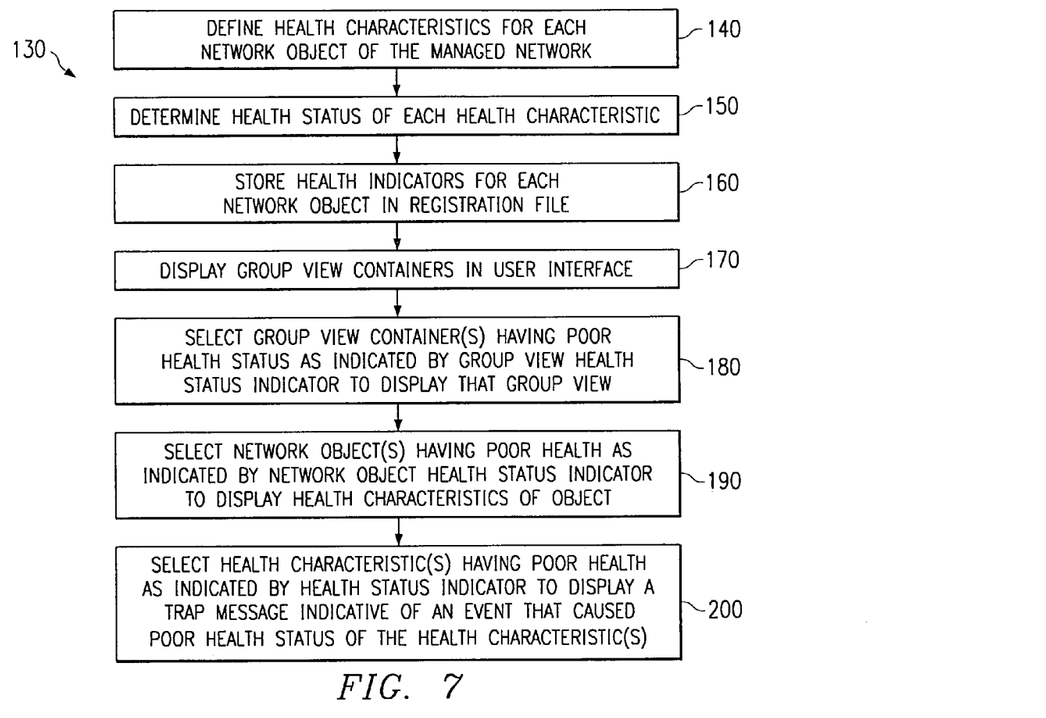
FIG. 7 illustrates of flow chart of dynamically drilling-down through a hierarchy of maps and sub-maps of a managed network to determine health status and causes of health problems associated with network objects of the managed network, according to the present invention.

Referring now to FIG. 7, the general methodology 130 of a preferred embodiment of the present invention for proactively determining health status of network objects and user-configurable group views of a windows-based managed network environment is shown. It is noted at the outset of the description of FIG. 7, that not all steps shown therein are necessarily performed in order to determine the root cause of concern; the amount of drill-down that is required is a function of where in the hierarchy of maps and sub-maps the administrator is located when initially alerted to the presence of a network object in poor health. Similarly, additional steps than those detailed in FIG. 7 may be required if the hierarchy of maps and sub-maps of the managed network so dictates; this is accomplished without departing from the spirit and scope of the invention. At Block 140, one or more health characteristics are defined for each network object of interest in the managed network environment.

As previously stated, network objects of the managed network environment may include network devices such as personal computers, workstations, servers, routers, printers, bridges, etc. and network services such as the Internet and electronic mail. Health characteristics, referred to as "Health Indicators" in the figures, provide information about the health of a particular network object and can include CPU utilization, memory utilization, network utilization, and disk utilization. For instance, if the network object is a network server, for instance, health characteristics may include disk utilization, memory utilization, network utilization, and processor utilization. The health status of each health characteristic of the network object of interest must be determined at Block 150. Each health characteristic has a health status that is reflected in a health status indicator; the health status of each health characteristic of a network object is used to determine the health status of the network object, and the health status of each network object of a grouped view (sub-map) is in turn used to determine the overall health status of that group view.

Figure 8:
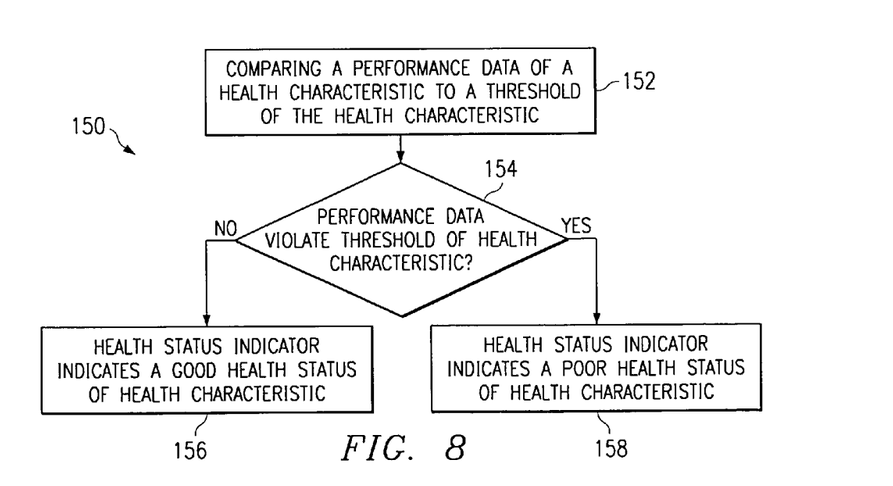
FIG. 8 illustrates a flow chart of determining health status of health characteristics of network objects, according to the present invention.

In the preferred embodiment of the present invention, determining the health status of each health characteristic is accomplished in the manner set forth in the methodology 150 of FIG. 8 by monitoring the health indicators previously defined. At Block 152, performance data related to the health characteristic of the network object of interest is compared to a preset (predetermined) threshold value of that health characteristic to determine if there is a problem. As an example, when a service level availability threshold in an electronic mail, Internet environment is violated (such that there is less than 90% availability for e-mail), health status indicators notify the administrator of the existence of a problem so that its root cause may be determined timely by drilling down through any sub-maps that exist in the hierarchy of the network.

If the performance data indicates that performance of the network object, as indicated by the performance data violating the preset threshold value for that health characteristic at Block 154, then the health status indicator of that health characteristic is changed to reflect a poor health status at Block 158. If, however, the performance data does not violate the threshold value then the health status indicator of the health characteristic is reflective of a good health status at Block 156. The health status indicator of a health characteristic may be a color of an icon of the health characteristic, a shape of the icon of the health characteristic, a sound associated with the health characteristic, or other appropriate indicators of health. For instance, the health status indicator may be the color red for the health characteristic icon of interest, the health characteristic icon shaped like a stop sign, or an audible alarm.

Moreover, indicators capable of communicating varying degrees of trouble may be utilized. Thus, a red icon may be used to indicate a more serious health problem than an orange or yellow icon, for example. Referring back to FIG. 7, at Block 160, the health indicators for each network object of interest are stored in a registration file of the appropriate group view; each group view has a registration file database used to store the attributes and health characteristics, or indicators, associated with all network objects within that group view. It is noted that the order of Blocks 150 and 160 of FIG. 7 may be reversed without departing from the spirit and scope of the invention.

Once the health characteristics of the network objects of interest have been defined and their health status determined, then the "drill down" process of proactively determining problem network objects of the managed network environment may commence. The first step is for a user of the system, such as the system administrator, to have notification that there is a problem of some sort with the network so that the process of proactively determining what the problem can begin. The initial indication of a network problem typically occurs at a high level and the system administrator would then "drill down" to find the specific cause of the problem using the user-configurable group views described earlier.

At Block 170, group view containers are displayed within a map of the user interface. Each group view container corresponds to a group view, or sub-map, in which network objects sharing the user-definable group view attributes described above and stored in a database are grouped. Each group view container displayed in the user interface has a group view health status indicator that is representative of the overall health status of its group view; the overall health status of the group view is determined by the health status of each network object of the network objects within the group view and the health status of each network object is determined by the health status of the health characteristics of a network object. As with the health status indicator of a health characteristic, the group view health status indicator may be color, shape, sound, or other indicator chosen to be appropriate to the particular network.

The user can select, through manipulation of the network user interface, one or more group view containers indicated to have an overall health problem at Block 180. Selection of the group view containers occurs within the preferred embodiment by clicking on the container of interest with a mouse within a window of a graphical user interface (GUI); one skilled in the art, however, will recognize that selection may occur through other means as well. Selection of a group view container causes the group view corresponding to that container to be displayed in the user interface. This is the first part of the drill-down process.

Because the group view container selected has an overall health problem as reflected in its group view health status indicator, at least one network object of the network objects displayed in the group view will also have poor health as reflected in the network object health status indicator of the network object. As with the health status indicator of a health characteristic and the group view health status indicator of a group view, a network object health status indicator may be color, shape, sound, or other indicator chosen to be appropriate to the particular network. At Block 190, the administrator or other user of the network will select the one or more network objects of the group view having a health problem; this is the next step of the drill-down process. Selecting a problem network object will cause one or more health characteristics of the object to be displayed within the user interface; because the network object thus selected has a health problem, at least one of the health characteristics of the network object will in turn have a health status indicator indicative of poor health. The health of each health characteristic thus displayed may be quickly and easily ascertained by its health status indicator, whether that be color, shape, sound, etc.

Now that one or more health characteristics of a network object have been found to have poor health on the network, the next and final step is to ascertain the root cause of health problem. This is accomplished, at Block 200, by selecting the health characteristic of concern in order to determine its health problem. Selection of a problem health characteristic will cause a message, indicative of the root health problem, to be displayed within the user interface. Typically, the message will be a trap or event message reflective of the critical event that caused the health problem and is stored as a field of the network object.

The message may be generated for any event type, including SNMP traps and CMIP events. If the invention is being used as part of an alarm browser, such as in Internet applications, the trap message may be stored in the alarm browser.

It is noted that the administrator of the managed network is provided an initial indication of a network problem via the health status indicators of either the group view containers, the network objects within the group view containers, or the health characteristics of the network objects. If the administrator is away from the NNM console, however, the occurrence of the performance data of a health characteristic of a network object violating a preset threshold value may operate to cause the administrator to be alerted at a remote location, such as by paging the administrator upon the occurrence of the critical event. This allows the critical event to be addressed as soon as possible in order to minimize negative impact on the end users of the network.

It is further noted that depending upon where the administrator is located within the hierarchy of maps (group view containers), sub-maps (group view of network objects), and health characteristics when performance of a network object fails to meet the preset standard for it, a complete drill-down may not be necessary to determine the root cause of the failure. Thus, for instance, an administrator who is looking at a group view sub-map of print servers when a particular print server in that group view has an icon that changes from a green to a red state (change of its network object health status indicator) will be automatically alerted at that level of the hierarchy that a problem exists and thus a complete drill-down from the group view containers is not necessary. The administrator would simply select the problem print server to see which of its health characteristics is indicated as being in poor health. The problem with the health characteristic would be displayed in a trap message after selecting the problem health characteristic as described above. In this example, at least one step of drill-down is eliminated.

Similarly, if the administrator is already viewing the health characteristics of a particular network object when the health status indicator of one of the health characteristics indicates trouble, the user would only have to select the problem health characteristic to then immediately view a message in the user interface about the critical event. By the same token, the drill-down described in FIGS. 7 and 8 does not prevent the user of a larger hierarchy of maps and sub-maps to be employed. In fact, there may be additional hierarchical layers of maps and sub-maps beyond that reflected in flow 130 without departing from the spirit and scope of the invention.

Figure 9:
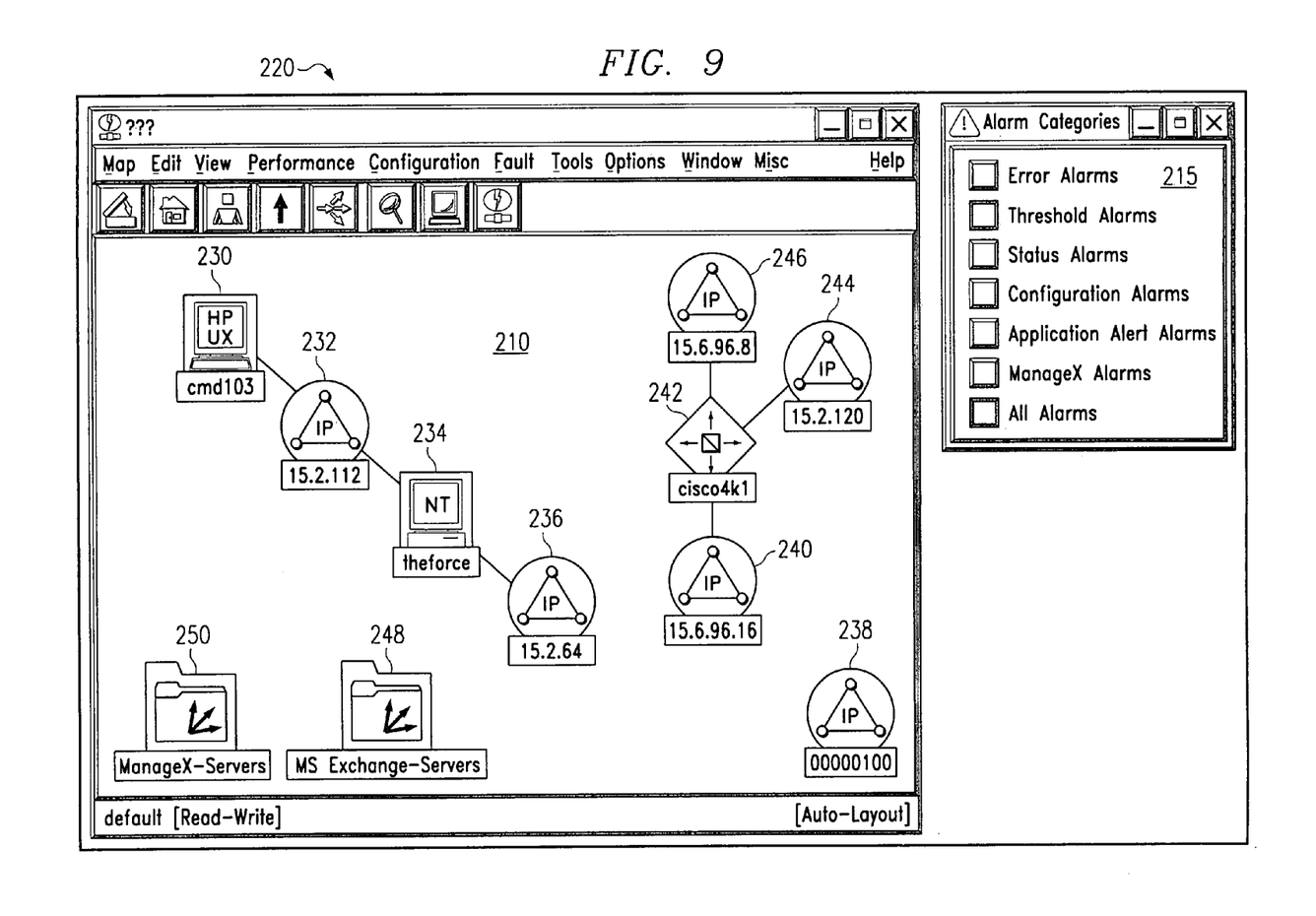
FIG. 9 illustrates a group view container and group view Internet map within a graphical user interface, in accordance with an embodiment of the present invention.
Figure 10:
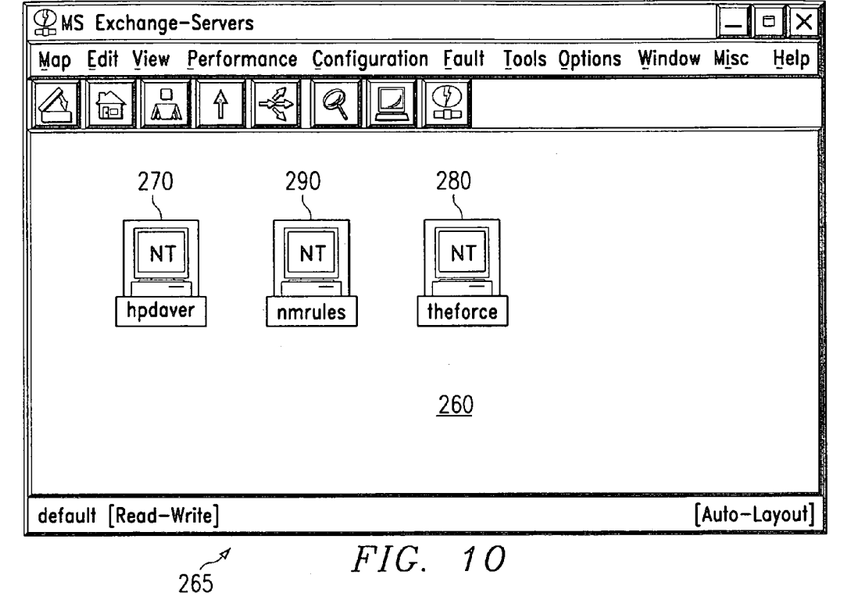
FIG. 10 illustrates a group view sub-map containing health status information, in accordance with the present invention.

An example of a specific implementation that might be used with the present invention is shown in FIGS. 9–13. In this example, the health status indicators for group view containers, group view network objects, and health characteristics are color-based. Referring now to FIG. 9, a group view container and group view Internet map 210 within a graphical user interface 220 is shown. Map 210 illustrates a number of network objects, including Internet network devices 230, 232, 234, 236, 238, 240, 242, 244, and 246, as well as group view containers 248 and 250. All of the network objects in map 210 have a green health status indicator, except for 232 which is yellow; group view container 248 for ManageX-Servers has a brown indicator while group view container for MS Exchange-Servers 250 has a red indicator. Also illustrated are the alarm categories 215 utilized in an alarm browser on the Internet. Error Alarms, Status Alarms, and Application Alert are indicated by the color brown in the alarm browser. Threshold alarms and All alarms are indicated by the color red in the alarm browser. ManageX and MS Exchange alarms are indicated by green in the alarm browser.

Of particular concern in map 210 is ManageX-Servers group view container 250, which is red in color, an indication that there is a potentially serious health problem with one or more of the network objects contained within container 250. Selecting container 250, such as by clicking on it, brings up the group view or sub-map 260 of the ManageX-Servers within the GUI 265 of FIG. 10; this is the first drill-down step in this example. Within group view 260 there are shown three ManageX-Servers: hpdaver server 270, nnmrules server 290, and theforce server 280. At a glance, a network administrator can see which of the servers contained within group view 260 has a health problem. hpdaver and theforce servers 270, 280 are both green, while nnmrules server 290 is blue. The blue network object health status indicator of nnmrules server 290 is the color blue, an indication of a poor health condition in this example.

Figure 11:
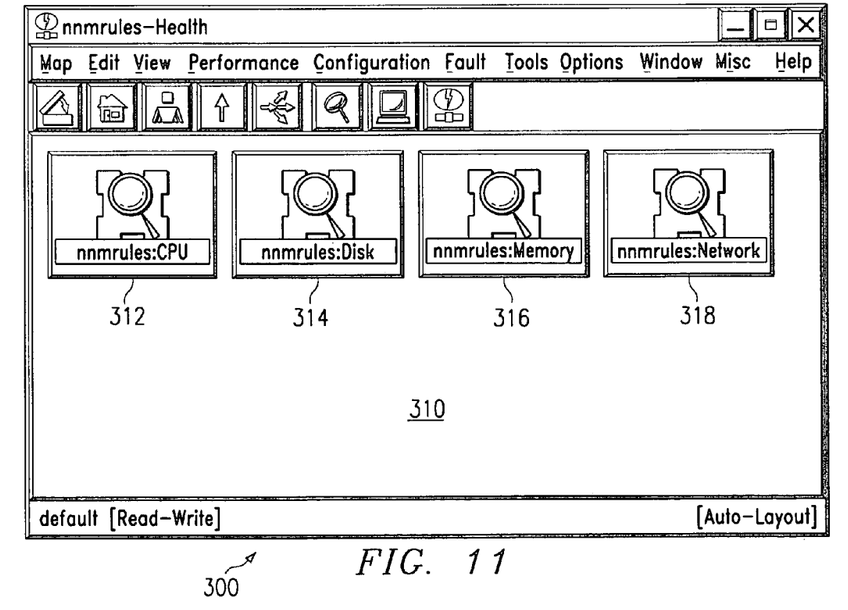
FIG. 11 illustrates the health characteristics of a network object, in accordance with the present invention.
Figure 12:
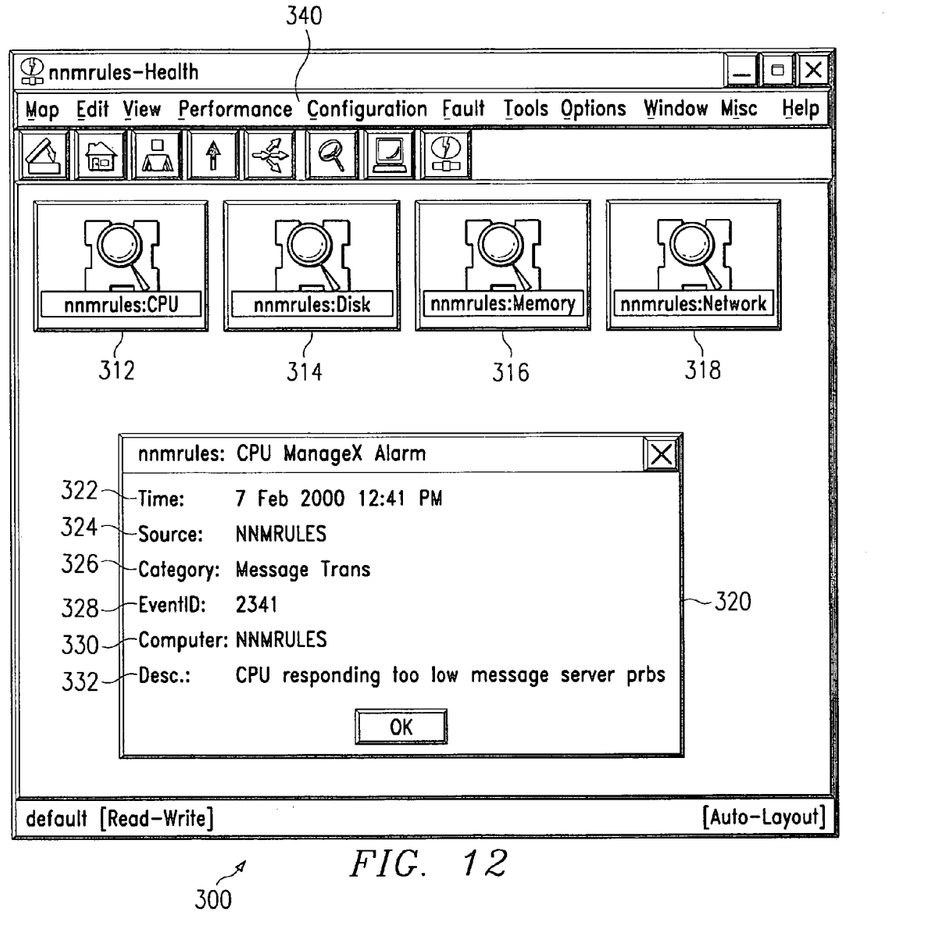
FIG. 12 illustrates a user interface that contains a message communicating the cause of a health problem of a network object, in accordance with the present invention.
Figure 13:
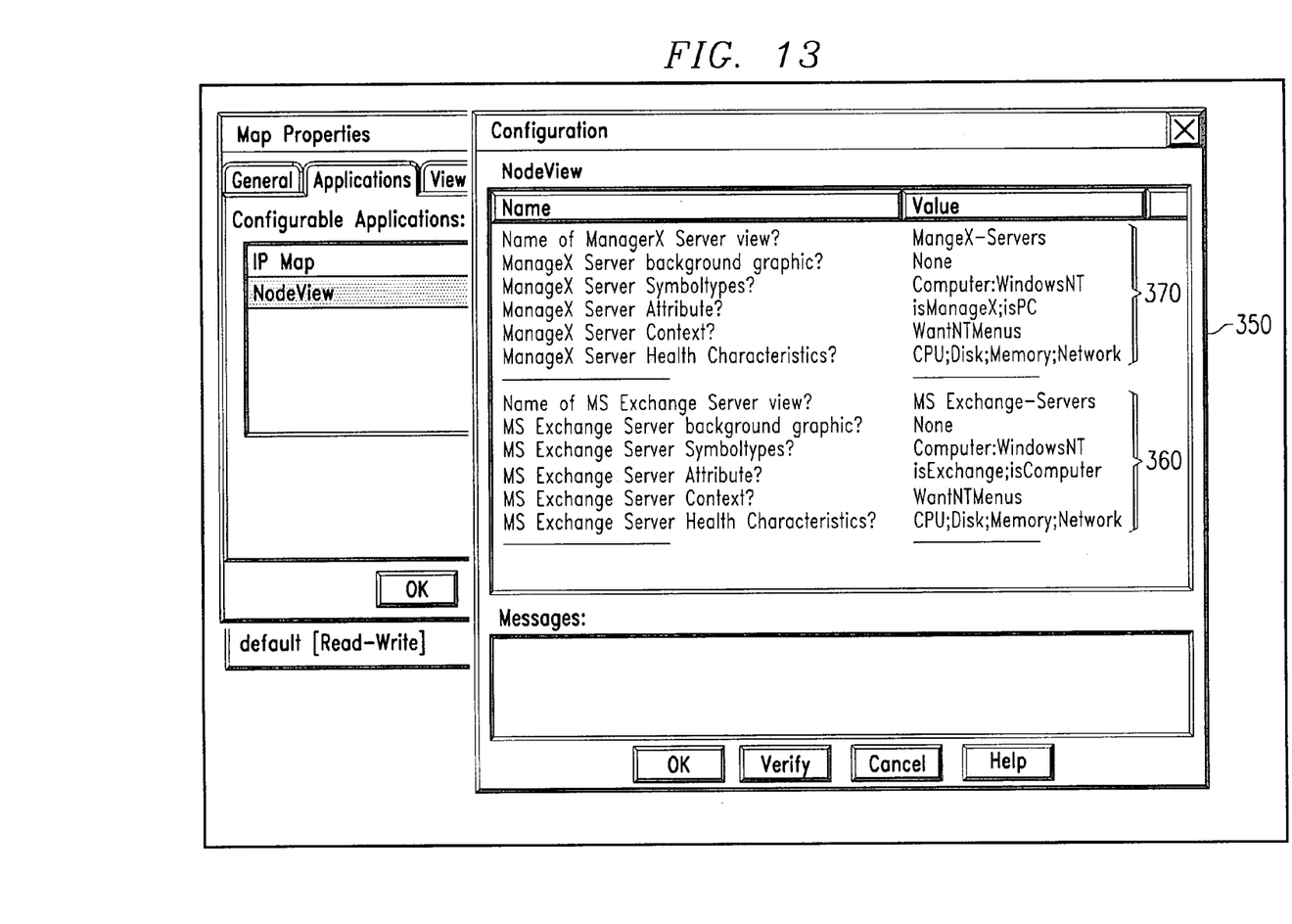
FIG. 13 illustrates contents of a registration file of user-configurable group views, in accordance with the present invention.

The administrator thus selects nnmrules server 290, such as by clicking on it with a point-and-click device, to drill-down to the health characteristics of this network device in FIG. 11. Displayed within GUI 300 are various health characteristics 310: nnmrules:CPU health characteristic 312, nnmrules:Disk health characteristic 314, nnmrules:Memory health characteristic 316, and nnmrules:Network health characteristic 318; as previously discussed, these health characteristics refer to CPU utilization, disk utilization, memory utilization, and network utilization, respectively. Only nnmrules:CPU health characteristic 312 has a health status indicator that is red; the health status indicators of the other health characteristics are green. Since red denotes an alarm in this example, the administrator can tell at a glance that the problem with nnmrules server 290, and thus with group container ManageX-Servers 250, is caused by nnmrules:CPU health characteristic 312. Next, in order to determine the exact cause of the poor CPU utilization health status of nnmrules server 290, the administrator selects nnmrules:CPU health characteristic 312. As shown in FIG. 12, this causes a pop-up window 320 to appear within GUI 300. Window 320 displays a detailed message made up of information 322–332 to the administrator about the cause of the problem, reflective of the last trap generated by poor CPU utilization. In this example, a critical event occurred on Feb. 7, 2000 at 12:41 PM (information 322). The source of the problem was the NNMRULES server (information 324) and the critical event had to do with message transmittal (information 326). The critical event identification number is 2341 (information 328); the event ID number can be used to further track the critical event if desired. The computer server affected was the NNMRULES server 312 (information 330). The following is the description or message of the problem (information 332): "CPU responding too low, message server prbs" Once the administrator has read the message displayed within window 320, the OK button 334 can be selected to exit window 320. At any time, the contents of the registration file of a group view may be viewed by selecting Map from the toolbar 340. In FIG. 13, the configuration enrollment blocks or contents 360 of the registration file for the MS Exchange-Servers group view and the contents 370 of the registration file for the ManageX group view are shown in window 350. As stated previously, the network objects displayed within a group view are sorted according to their attributes. Additionally, information about the name, background graphic, symboltypes, context, and health indicators (characteristics) may be learned by viewing the contents of a group view's registration file. The above description, taken in conjunction with the drawings, defines an invention that offers various advantages in the art. There is a direct correlation between alarm indicators and the occurrence of an event or trap that caused the alarm to be generated. Previously, while an indicator, such as color of an icon, could be used to indicate poor network object health in general, there was no way to easily and readily directly correlate that indicator to the cause of the problem. Drilling-down on icons indicated as having health concerns allows the administrator or perhaps other user of the network to not only trace the problem to a specific network object and its attendant health characteristics, but to receive detailed information, in the form of a message, that is specific to the actual critical event or condition responsible for the poor health of the object. The solution provided by the present invention is highly proactive, able to automatically detect and communicate present or potential problem areas to a network administrator for immediate correction, potentially before end users are impacted.

While the invention has been particularly shown and described with reference to a preferred embodiment, it will be understood by those skilled in the art that various changes in form and detail may be made therein without departing from the spirit and scope of the invention.

What is claimed is:

1. A method for allowing a user to determine a health status of network objects in a managed network environment, comprising:

displaying a plurality of group view containers each corresponding to a group of network objects sharing at least one user-definable group view attribute, and providing for each group view container an indicator representative of the overall health status of its corresponding group of network objects based on a health status of each of the group's network objects;

for each network object in a group of network objects corresponding to a user-selected group view container, displaying a representation of the network object, and providing an indicator representative of a health status of the network object as determined by at least one user-definable health characteristic of the network object;

for each of the at least one health characteristic of a user-selected network object, displaying a representation of the health characteristic, and providing an indicator representative of a health status of the health characteristic;

receiving a user selection to modify one of the plurality of group view containers;

presenting to the user, in response to the user selection, a user interface listing the user-definable group view attributes for the selected group view container; and receiving via the user interface a user modification of one or more of the listed group view attributes.

2. The method of claim 1, further comprising:
for each user-selected health characteristic, displaying any event or trap message indicative of an event affecting the health status of the user-selected health characteristic.

3. The method of claim 2, wherein the event or trap message indicative of an event affecting the health status of a user-selected health characteristic is stored as a field of the network object for which the health characteristic is defined.

4. The method of claim 3, wherein the field comprises a field of the network object in an alarm browser used in an Internet application.

5. The method of claim 1, wherein providing a health status indicator of each health characteristic comprises:
causing the health status indicator of the health characteristic to indicate a poor health condition of the health characteristic when performance data of the health characteristic violates a predetermined threshold of the health characteristic.

6. The method of claim 1, further comprising:
storing the at least one health characteristic for each network object in a health characteristic configuration file of the corresponding group view to which the network object belongs.

7. The method of claim 6, wherein the health characteristic configuration file corresponding to each group of network objects is a registration file.

8. The method of claim 1, wherein the user can dynamically change network objects of a group of network objects by changing one or more of the at least one user-definable group view attribute of that group of network objects.

9. The method of claim 1, wherein the at least one health characteristic of a network object comprises one or more of a group consisting of disk utilization, memory utilization, network utilization, and processor utilization.

10. The method of claim 1, wherein the at least one of the network object is either a network device or a network service of the managed network environment.

11. The method of claim 1, further comprising:
storing the at least one group view attribute for each group of network objects in a attribute configuration file of the corresponding group to which the network object belongs.

12. The method of claim 11, wherein the attribute configuration file corresponding to each group of network objects is a registration file.

13. The method of claim 1, wherein the indicator representative of the overall health status of a corresponding group of network objects comprises either a color or a shape of an icon representing the corresponding group view container.

14. The method of claim 1, wherein the indicator representative of the overall health status of a corresponding group of network objects comprises an audible alarm.

15. The method of claim 1, wherein the indicator representative of the health status of a network object comprises either a color or a shape of a displayed icon of the network object.

16. The method of claim 1, wherein the indicator representative of the health status of a network object comprises an audible alarm.

17. The method of claim 1, further comprising:
determining context sensitive information of a user-selected group view; and
modifying, in accordance with the determined context information, at least one of a menubar, popup menu, or toolbar included in the user interface when the user-selected group view is selected by the user.

18. A system for allowing a user to determine a health status of network objects in a managed network environment, comprising:
means for displaying a plurality of group view containers each corresponding to a group of network objects sharing at least one user-definable group view attribute, and for providing for each group view container an indicator representative of the overall health status of its corresponding group of network objects based on a health status of each of the group's network objects;
means for displaying a representation of the network object, and for providing an indicator representative of a health status of the network object as determined by at least one user-definable health characteristic of the network object for each network object in a group of network objects corresponding to a user-selected group view container;
means for displaying a representation of the at least one health characteristic, and for providing an indicator representative of a health status of the health characteristic, for each health characteristic of a user-selected network object;
means for receiving a user selection to modify one of said plurality of group view containers;
means for presenting to the user, in response to the user selection, a listing the user-definable group view attributes for the selected group view container; and
means for receiving a user modification of one or more of the listed group view attributes.

19. The system of claim 18, further comprising:
means for displaying any event or trap message indicative of an event affecting the health status of the user-selected health characteristic for each user-selected health characteristic.

20. The system of claim 18, wherein the means for providing a health status indicator of each health characteristic comprises:
means for causing the health status indicator of the health characteristic to indicate a poor health condition of the health characteristic when performance data of the health characteristic violates a predetermined threshold of the health characteristic.

21. The system of claim 18, further comprising:
means for storing the at least one health characteristic for each network object in a health characteristic configuration file of the corresponding group view to which the network object belongs.

22. The system of claim 18, wherein the at least one of the network object is either a network device or a network service of the managed network environment.

23. The system of claim 18, further comprising:
means for storing the at least one group attribute for each group of network objects in a attribute configuration file of the corresponding group view to which the network object belongs.

24. The system of claim 18, further comprising:
means for determining context sensitive information of a user-selected group view; and
means for modifying, in accordance with the determined context information, at least one of a menubar, popup menu, or toolbar included in the user interface when the user-selected group view is selected by the user.

\* \* \* \* \*